A. M. ERICKSON.
SEAMLESS JACKETED KETTLE.
APPLICATION FILED MAR. 3, 1911.
1,004,001.
Patented Sept. 26, 1911.
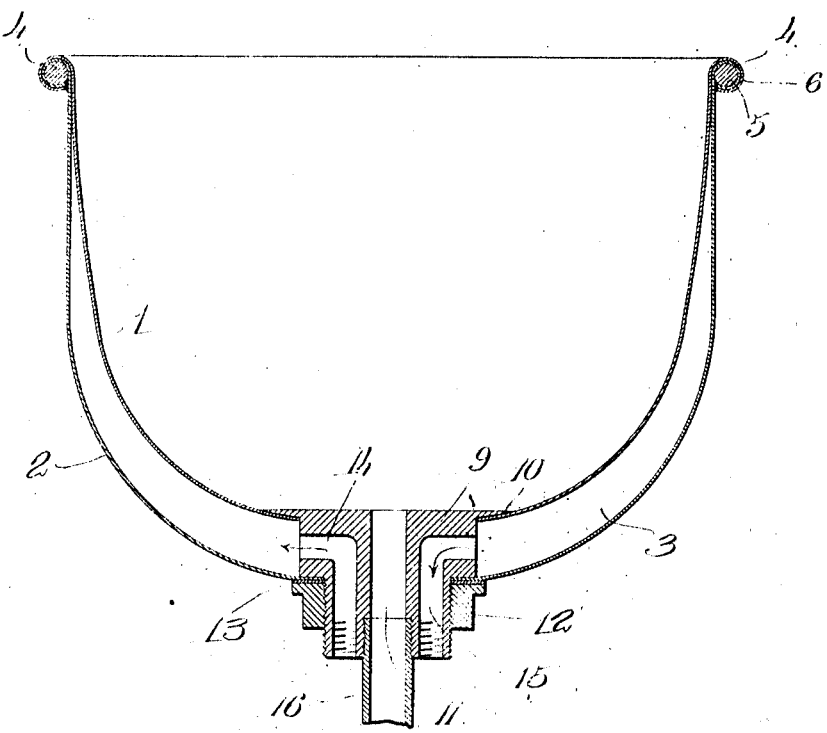
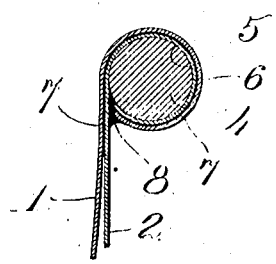
Witnesses:
Thomas J. Drummond
Joseph M. Ward.
Inventor.
Axel M. Erickson,
by Edwards, Heard Smith
Att'ys.

UNITED STATES PATENT OFFICE.

AXEL M. ERICKSON, OF CAMBRIDGE, MASSACHUSETTS, ASSIGNOR TO S. D. HICKS & SON, OF BOSTON, MASSACHUSETTS.

SEAMLESS JACKETED KETTLE.

1,004,001.     Specification of Letters Patent.    Patented Sept. 26, 1911.

Application filed March 3, 1911. Serial No. 612,005.

*To all whom it may concern:*

Be it known that I, AXEL M. ERICKSON, a citizen of the United States, and resident of Cambridge, county of Middlesex, State of Massachusetts, have invented an Improvement in Seamless Jacketed Kettles, of which the following description, in connection with the accompanying drawing, is a specification, like characters on the drawing representing like parts.

This invention has for its object the production of a novel seamless jacketed kettle for use in dyeing, tanning, candy making, and other processes wherein the contents of the kettle are heated by the circulation of steam or other heating medium in the jacket, the kettle forming the subject of my present invention being constructed without rivets or similar fastenings.

Ordinarily steam jacket kettles are made by uniting the rim portions of the inner and outer shells by one or more rows of rivets to form a fluid-tight joint for the heating chamber provided by spacing apart the shells, and the outer shell or jacket is provided on opposite sides with tubular nipples for attachment to the inlet and outlet pipes for the steam or other heating medium. The use of rivets is objectionable, for not only is the cost of the kettle increased but great care has to be taken in order to prevent leakage, while the use of the inlet and outlet nipples is also objectionable for similar reasons.

By my invention I obviate the use of the rivets and also do away with the separate nipples in the jacket, reducing the cost of the kettle and at the same time increasing its strength and efficiency.

The novel features of my invention will be fully described in the subjoined specification and particularly pointed out in the following claim.

Figure 1 is a vertical diametral section of a jacketed kettle embodying my present invention; Fig. 2 is an enlarged sectional detail of the rim-stiffening member and the fluid-tight joint formed adjacent thereto between the shell and the jacket of the kettle.

In accordance with my invention the kettle comprises an inner shell 1, and an outer shell or jacket 2, both of copper or other suitable seamless sheet metal, spun or otherwise formed into the desired shape, and spaced apart at their lower portions to provide a chamber 3, Fig. 1, for the circulation of steam or other heating medium between the shell and jacket. Around the rim of the kettle I place a rod, heavy wire or other stiffening member 4, herein shown and preferably circular in cross-section. The inner faces of the rim portions of both the shell and jacket are tinned or otherwise suitably prepared to be sweated together by solder, and the jacket is first rolled around the stiffening member, as at 5. Thereafter the rim portion of the shell 1 is rolled around said member 4 and superposed upon the rolled part 5 of the jacket, as at 6, the superposed portions being united, preferably by sweating with solder, indicated in Fig. 2 by the heavy line 7. A perfect and fluid-tight joint is thus provided between the shell and jacket at the rim portion thereof, and preferably I run solder into the corner between the jacket and the rolled rim portions, at 8, Fig. 2. Thereby I obviate the use of rivets or similar fastenings and preserve the unbroken continuity of the shell and jacket adjacent the rim of the kettle, while securing a superior fluid-tight closure for the chamber 3, and at the same time I properly stiffen and strengthen the rim of the kettle by the member 4.

The head of the nipple 9, having a flange 10 sweated or brazed to the interior of the shell 1 at the bottom thereof, and provided with usual drainage duct 11, is interposed between the bottoms of the shell and jacket, as is customary, a nut 12 and packing 13 securing the nipple in place and preventing leakage from the heating or jacket chamber 3. In accordance with this portion of my invention, however, I make the nipple somewhat larger than usual, and form therein separate inlet and outlet passages 14, 15, said passages being shown as substantially L-shaped, at opposite sides of the duct 11 and with their inner ends communicating with the chamber 3 and turned in opposite directions. As shown in Fig. 1 the outer ends of the passages are internally threaded at 17 and 18, for the reception of the ends of suitable supply and discharge pipes (not shown) whereby steam or other desired heating medium may be caused to circulate in the chamber 3 to heat the kettle and its contents.

The drainage duct 11 is connected with a suitable drainage pipe 16, partly shown in Fig. 1. By utilizing the drainage nipple also for the inlet and outlet ports or passages for the jacket chamber 3 I obviate the use of separate nipples in the jacket 2, and preserve the continuity thereof.

The drainage nipple 9, with its central duct, has been used heretofore in jacketed kettles, serving not only to drain the inner shell but also to fixedly connect and positively space apart the bottom of the shell and jacket, but so far as I am aware such nipple has never been provided, heretofore, with means for the ingress and egress of the heating medium for the jacket chamber.

By my novel construction the efficiency of the kettle is increased, its cost is reduced, and the continuity of the inner shell and the jacket is maintained between the nipple and the rim of the kettle.

Changes or modifications in details of construction and arrangement may be made by those skilled in the art without departing from the spirit and scope of my invention as set forth in the claim hereunto annexed.

Having fully described my invention, what I claim as new and desire to secure by Letters Patent is:

A jacketed kettle comprising seamless inner and outer shells of sheet metal spaced apart to form a chamber for the circulation of a heating medium, the outer shell constituting a jacket, said shells being secured together at their upper edges to form a fluid-tight joint, and a nipple connecting the bottom of the inner shell and the jacket and having a drainage duct for the shell, said nipple having separate passages communicating with the chamber for the admission and discharge of the heating medium whereby the shells of sheet metal are intact except for connection with said nipple.

In testimony whereof, I have signed my name to this specification, in the presence of two subscribing witnesses.

AXEL M. ERICKSON

Witnesses:
 JOHN C. EDWARDS,
 S. T. HICKS.